June 17, 1941. J. M. LAMB 2,245,692
SHOVEL
Filed Feb. 17, 1940
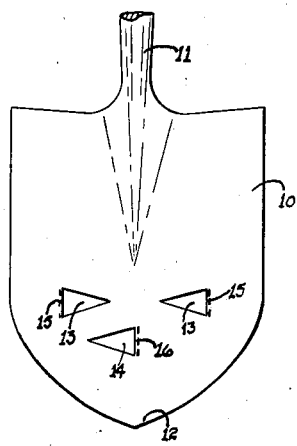
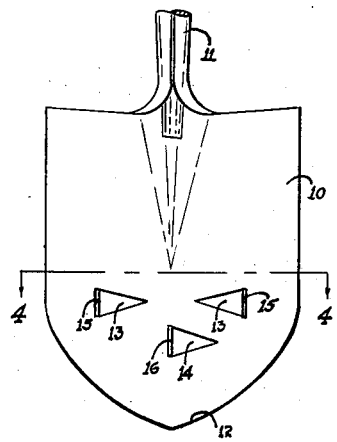
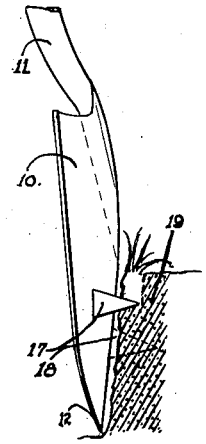
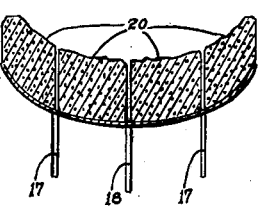
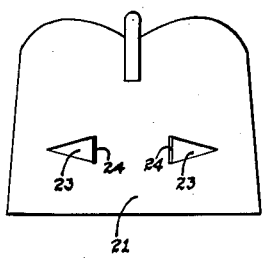
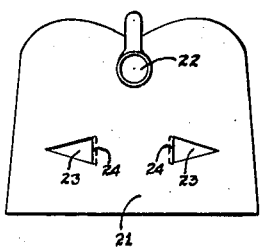
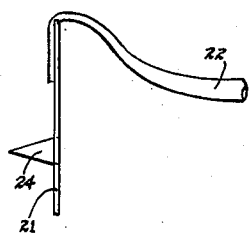
INVENTOR
JOHN M. LAMB
BY
ATTORNEY Patented June 17, 1941

2,245,692

UNITED STATES PATENT OFFICE 2,245,692

SHOVEL

John M. Lamb, Salem, Oreg.

Application February 17, 1940, Serial No. 319,505

1 Claim. (Cl. 294—49)

This invention relates generally to agricultural implements, and particularly to a spading shovel or hoe.

The main object of this invention is to construct a shovel or hoe which will not only remove sections of ground but will cut up these sections into small strips and thoroughly distintegrate same thereby improving the quality of the seed bed.

The second object is to construct an implement of the class described without detracting from the usual functions of such implements.

The third object is to construct an implement of the class described without adding materially to the cost or detracting from the strength thereof.

These and other objects are accomplished in the manner set forth in the following specification as illustrated in the accompanying drawing, in which:

Fig. 1 is a fragmentary front elevation of a shovel constructed in accord with my invention.

Fig. 2 is a rear elevation of Fig. 1.

Fig. 3 is a side elevation of Fig. 1 showing a bank of earth in cross-section and the relation of the cutting blades thereto.

Fig. 4 is a section taken along the line 4—4 in Fig. 2, showing the sliced condition of a shovelful of earth.

Fig. 5 is a front elevation of a hoe showing my invention applied thereto.

Fig. 6 is a rear elevation of Fig. 5.

Fig. 7 is a side elevation of Fig. 5.

Similar numerals refer to similar parts throughout the several views.

Referring in detail to the drawing, there is shown a shovel 10 having the usual handle 11 and the rounded point 12. In the lowermost portion of the shovel 10 are formed the triangular openings 13 and 14. It will be noted that the edges 15 of the openings 13 are parallel to the axis of the handle 11 and disposed on opposite sides thereof, whereas the side 16 of the opening 14 coincides with the axis of the handle 11 and is substantially midway between the edges 15.

The material which is punched out of the openings 13 and 14 is turned backwardly to form the pointed cutting blades 17 and 18 which are in parallelism with each other.

It will be noted in Fig. 3 that as the shovel 10 is forced downwardly to remove a portion of the bank 19 that the blades 17 and 18 slice the unremoved portions of the bank into strips so that the next shovelful will consist of a plurality of slices of earth thereby tending to completely disintegrate the ground and facilitate the formation of a perfect seed bed. These slices 20 are shown separate although in actual practice they will of course contact each other after the blades 17 and 18 have passed between same.

In Figs. 5, 6 and 7 is shown a hoe blade 21 provided with the usual handle 22. The blade 21 has formed therein the triangular openings 23 from which are formed the pointed blades 24. These are preferably on the side away from the handle 22 although they may be on either or both sides of the blade 21 without departing from the spirit of this invention. The same is true of the shovel form of the device wherein certain conditions may require that the blades 17 and 18 project from the side of the handle opposite the one shown.

While I have thus illustrated and described my invention, it is not my intention to cover such devices broadly but I do intend to cover all such forms and modifications thereof as fall fairly within the appended claim.

I claim:

A shovel of the class described, characterized by having three triangular slots formed therein, two of said slots being directly opposite each other and having their opposite ends in parallelism and having the metal from said slots turned outwardly along said parallel edges to form cutting blades, the third triangular slot being between the first two slots and the shovel point, the third slot having the metal therefrom turned outwardly to form a cutting blade between the two first mentioned cutting blades and in parallelism therewith.

JOHN M. LAMB.